United States Patent

(12) United States Patent
Sun

(10) Patent No.: US 8,928,801 B2
(45) Date of Patent: Jan. 6, 2015

(54) ADJUSTMENT APPARATUS FOR CAMERA MODULE

(71) Applicant: Ingrasys Technology Inc., Taoyuan (TW)

(72) Inventor: Yu-Hung Sun, Taoyuan (TW)

(73) Assignee: Ingrasys Technology Inc., Taoyuan (TW)

( * ) Notice: Subject to any disclaimer, the term of this patent is extended or adjusted under 35 U.S.C. 154(b) by 35 days.

(21) Appl. No.: 13/905,158

(22) Filed: May 30, 2013

(65) Prior Publication Data

US 2014/0320727 A1    Oct. 30, 2014

(30) Foreign Application Priority Data

Apr. 30, 2013  (TW) .............................. 102115368 A

(51) Int. Cl.
  *H04N 5/225*  (2006.01)
  *H04N 5/232*  (2006.01)
(52) U.S. Cl.
  CPC ............. *H04N 5/2254* (2013.01); *H04N 5/232* (2013.01)
  USPC ............................ 348/360; 348/143; 348/335
(58) Field of Classification Search
  CPC ................................ H04N 5/2254; H04N 7/18
  USPC .................... 348/143, 36, 360, 335; 359/822
  See application file for complete search history.

(56) References Cited

U.S. PATENT DOCUMENTS

| 7,534,057 B2 * | 5/2009 | Jones et al. ................... 396/427 |
| 7,692,886 B1 * | 4/2010 | Lai ................................. 359/822 |
| 2006/0077577 A1 | 4/2006 | Cheng et al. |
| 2007/0019947 A1 * | 1/2007 | Shimada ....................... 396/329 |

FOREIGN PATENT DOCUMENTS

| JP | 06258564 A | 9/1994 |
| JP | 2004013006 A | 1/2004 |
| WO | 2005040888 A1 | 5/2005 |

* cited by examiner

*Primary Examiner* — Tuan Ho
(74) *Attorney, Agent, or Firm* — Novak Druce Connolly Bove + Quigg LLP

(57) ABSTRACT

An adjustment apparatus for adjusting a camera lens with an adjustment pin includes a supporting bracket, a gear assembly installed to the supporting bracket, a motor mounted to the supporting bracket, a controller electrically connected to the motor, and an adjustment member movably installed to the supporting bracket. The adjustment member includes two spaced clamping poles clamping the adjustment pin of the camera lens. The controller controls the motor to rotate and the motor drives the gear assembly to rotate, to drive the adjustment member to move. Thereby, the adjustment pin is moved by the clamping pins to adjust the camera lens.

18 Claims, 5 Drawing Sheets

ADJUSTMENT APPARATUS FOR CAMERA MODULE

BACKGROUND

1. Technical Field

The present disclosure relates to an adjustment apparatus for adjusting a camera module.

2. Description of Related Art

Cameras have a lens unit with an adjustment member. However, some cameras, especially for those used for surveillance purpose, often are installed at a high position, and it is time-consuming and often difficult to control the adjustment member.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
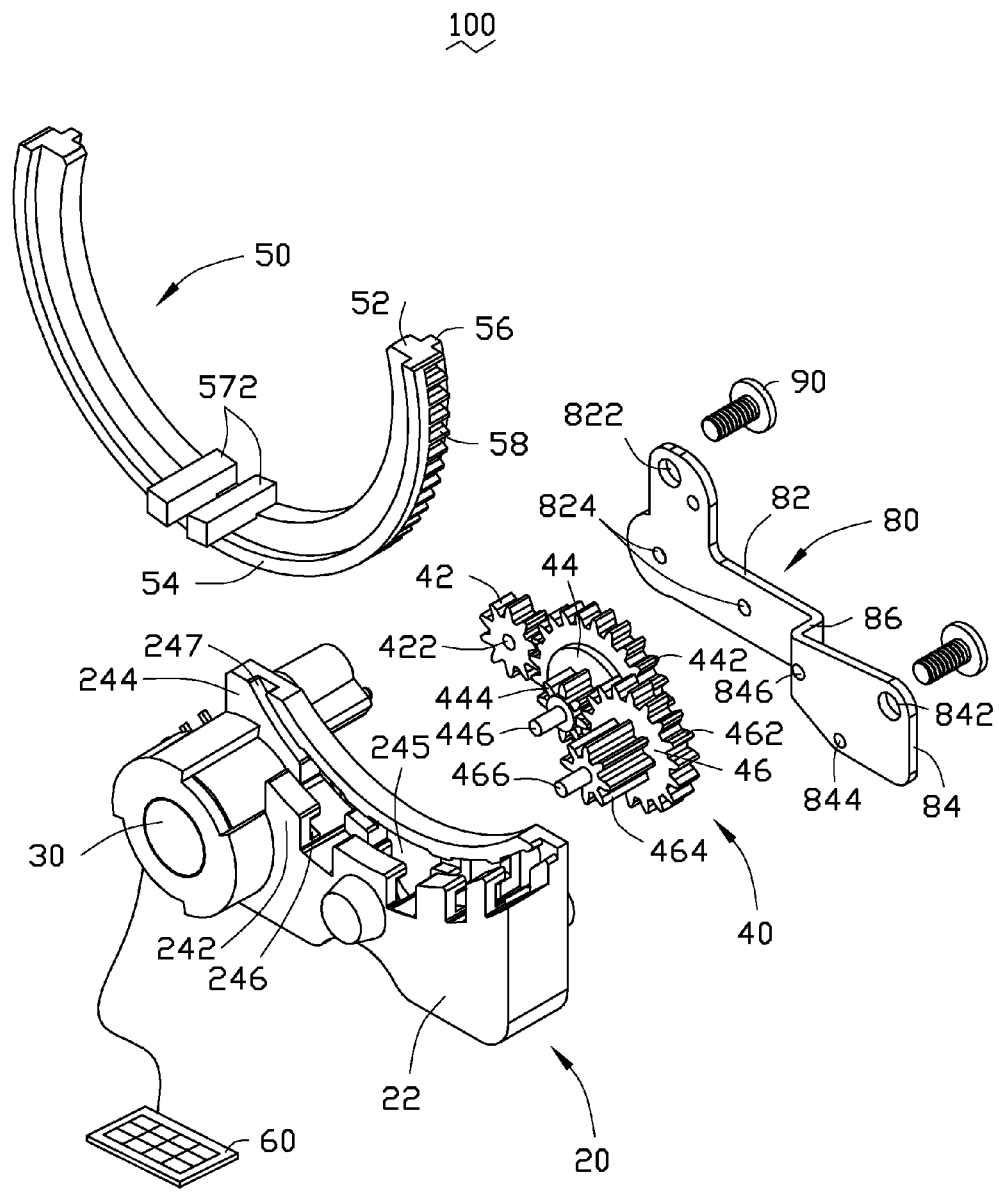
FIG. 1 is an isometric, exploded view of an embodiment of an adjustment apparatus.
Figure 2:
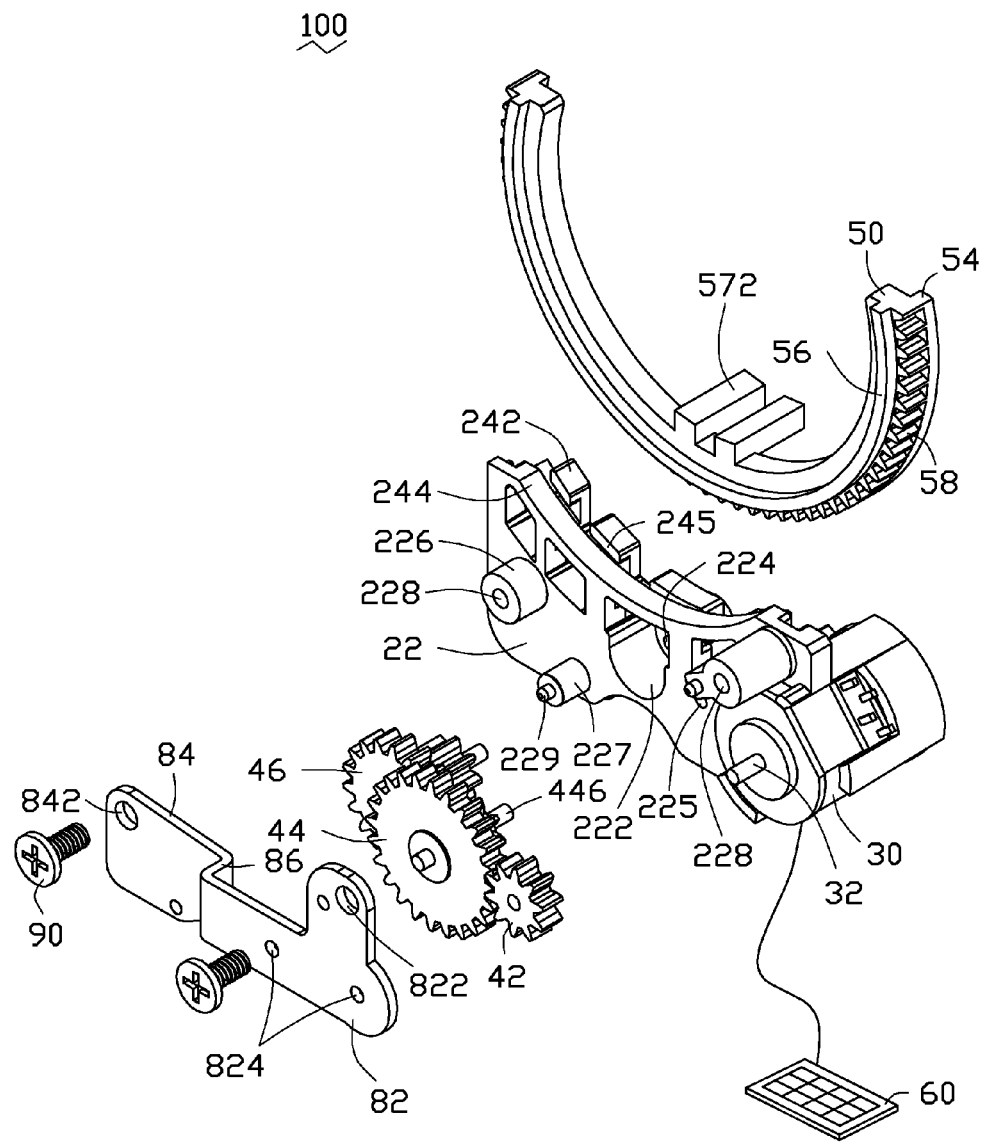
FIG. 2 is similar to FIG. 1, but viewed from another perspective.

FIGS. 1 and 2 show an embodiment of an adjustment apparatus 100. The adjustment apparatus 100 includes a supporting bracket 20, a motor 30 mounted in an end of the supporting bracket 20, a gear assembly 40, an adjustment member 50, a controller 60, a positioning member 80, and two fasteners 90.

The supporting bracket 20 includes a supporting block 22. A top surface of the supporting block 22 defines an arc-shaped indent 245 in a center. An arc-shaped first supporting plate 242 extends up from a first side of the top surface of the supporting block 22, at a side of the indent 245. An arc-shaped second supporting plate 244 extends up from a second side of the top surface of the supporting block 22, at an opposite side of the indent 245. An inner surface of the first supporting plate 242 facing the indent 245 defines an arc-shaped first guiding slot 246 extending along an extending direction of the indent 245. An inner surface of the second supporting plate 244 facing the indent 245 defines an arc-shaped second guiding slot 247 extending along the extending direction of the indent 245. An outer surface of the second supporting plate 244 defines a receiving space 222 communicating with the indent 245, and a shaft hole 225 adjacent to the receiving space 222. The first supporting plate 242 defines a shaft hole 224 aligning with the receiving space 222. Two connecting poles 226 and a positioning pole 227 perpendicularly extend out from two ends and a middle of the supporting block 22, at the same side with the second supporting plate 244. Each connecting pole 226 axially defines a screw hole 228. A pin 229 axially extends out from a distal end of the positioning pole 227 opposite to the supporting block 22.

The motor 30 includes a rotation shaft 32 perpendicularly extending through the second supporting plate 244 of the supporting block 22.

The gear assembly 40 includes a drive gear 42, a first slave gear member 44, and a second slave gear member 46. The drive gear 42 axially defines a mounting hole 422. The first slave gear member 44 includes a first shaft 446, a first gear 442, and a second gear 444. A diameter of the first gear 442 is greater than a diameter of the second gear 444, and the first and second gears 442 and 444 are coaxially mounted on the first shaft 446. The drive gear 42 meshes with the first gear 442. The second slave gear member 46 includes a second shaft 466, a third gear 462, and a fourth gear 464. A diameter of the third gear 462 is greater than a diameter of the fourth gear 464, and the third and fourth gears 462 and 464 are coaxially installed on the second shaft 466. The third gear 462 is meshed with the second gear 444 of the first slave gear member 44.

The adjustment member 50 includes an arc-shaped sliding bar 52, a first guiding bar 54 protruding out from a first side of the sliding bar 52 and extending along a bend direction of the sliding bar 52. In addition, a second guiding bar 56 protruding out from a second side of the sliding bar 52 opposite to the first guiding bar 54 and extending along the bend direction of the sliding bar 52. An outer surface of the sliding bar 52 defines an arc-shaped rack 58 extending along the bend direction of the sliding bar 52. Two spaced and opposite clamping poles 572 perpendicularly extend out from a middle of an inner surface of the sliding bar 52.

The controller 60 is electrically connected to the motor 30 for controlling the motor 30.

The positioning member 80 includes a substantially L-shaped first positioning plate 82, a second positioning plate 84 parallel to the first positioning plate 82, and a connecting plate 86 perpendicularly connected between the first and second positioning plates 82 and 84. The first positioning plate 82 defines a through hole 822 in a distal end of the first positioning plate 82 opposite to the connecting plate 86, and two spaced shaft holes 824 away from the through hole 822. The second positioning plate 84 defines a through hole 842 in a distal end of the positioning plate 84 opposite to the connecting plate 86, a shaft hole 846 adjacent to the connecting plate 86, and a positioning hole 844 between the through hole 842 and the shaft hole 846.

In the embodiment, each fastener 90 is a screw.

Figure 3:
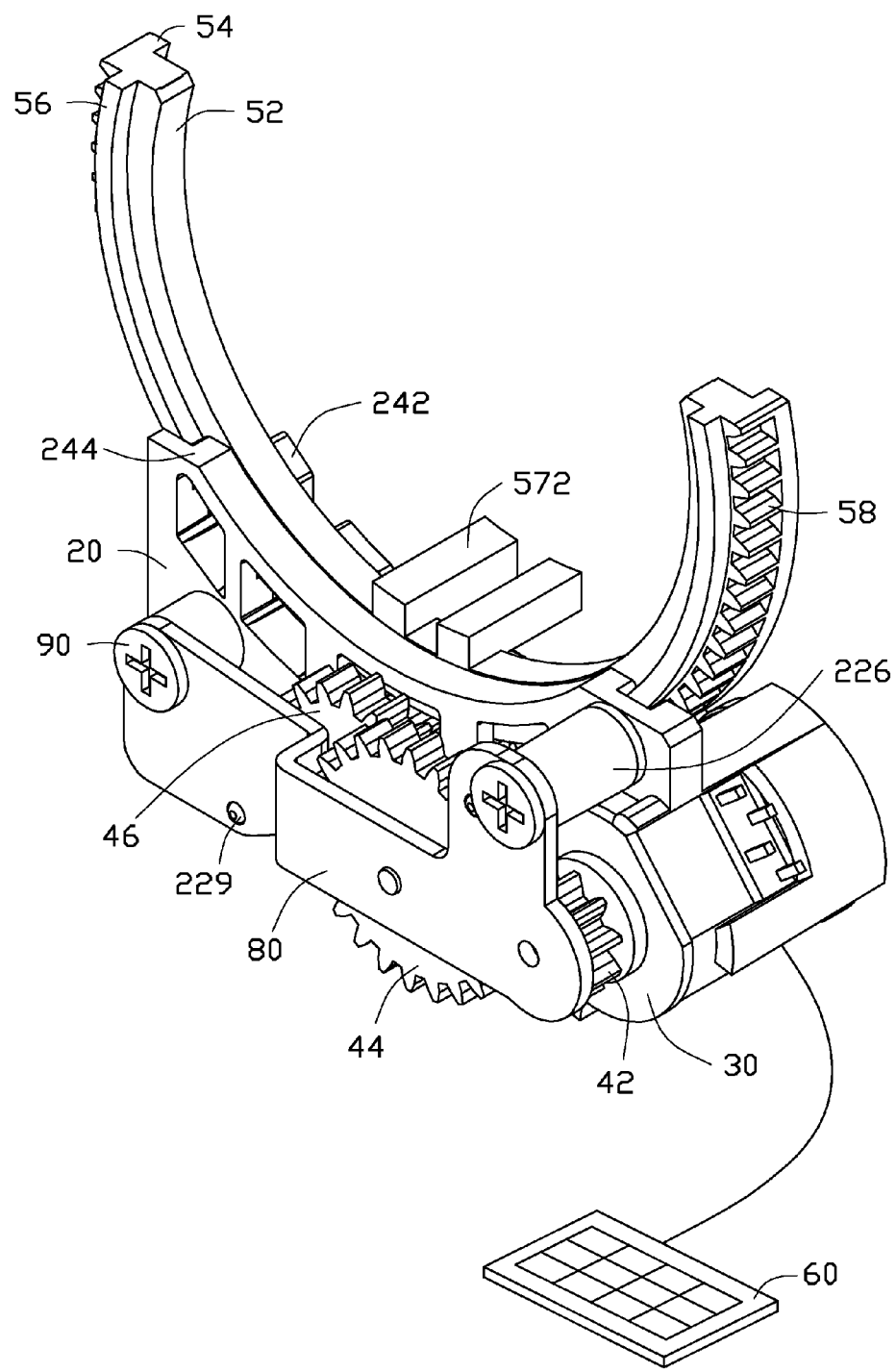
FIG. 3 is an assembled, isometric view of FIG. 2.

FIG. 3 shows that in assembly of the adjustment apparatus 100, the adjustment member 50 is inserted into the indent 245 of the supporting bracket 20, with the first and second guiding bars 54 and 56 slidably received in the first and second guiding slots 246 and 247 of the supporting bracket 20, respectively. The gear assembly 40 is located at the outer surface of the second supporting plate 244 in the same side with the rotation shaft 32. The rotation shaft 32 is inserted into the mounting hole 422 of the drive gear 42. An end of the first shaft 446 is rotatably inserted into the shaft hole 225 of the supporting block 22. The fourth gear 464 is rotatably received in the receiving space 228, and an end of the second shaft 466 is rotatably inserted into the shaft hole 224. A part of the fourth gear 464 is inserted in the indent 245 to mesh with the rack 58 of the adjustment member 50. The positioning member 80 is covering the gear assembly 40, to allow the distal end of the rotation shaft 32 and an opposite end of the first shaft 446 to be rotatably inserted in the shaft holes 824. An opposite end of the second shaft 466 is rotatably inserted into the shaft hole 846. The pin 229 of the positioning pole 227 is inserted in the positioning hole 844 of the positioning member 80. The fasteners 90 extend through the through holes 822 and 842, to be mounted in the screw holes 228 of the connecting poles 226.

Figure 4:
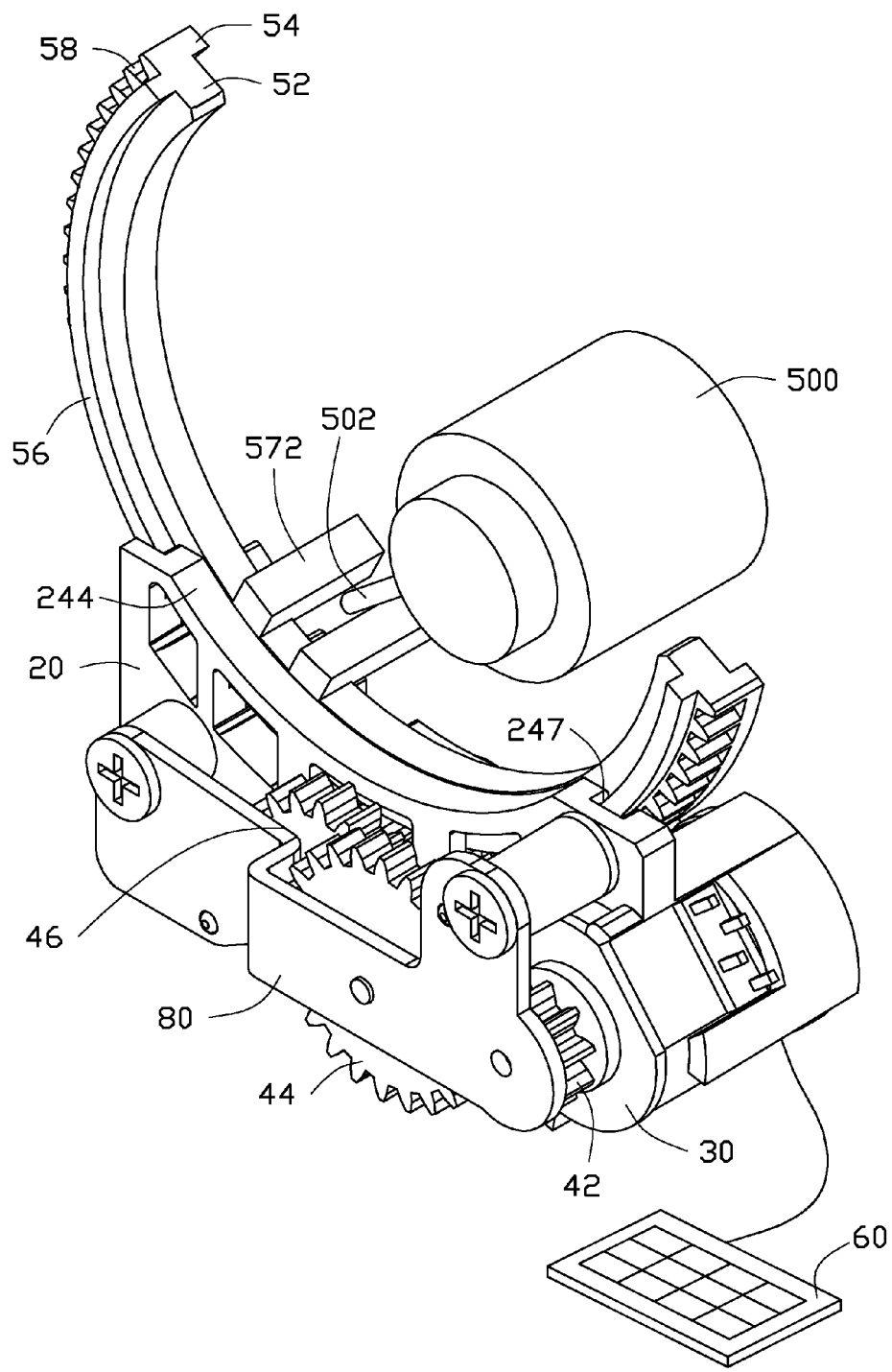
FIG. 4 and FIG. 5 are similar to FIG. 3, but show the adjustment apparatus together with a camera module in two different states of use, respectively.
Figure 5:
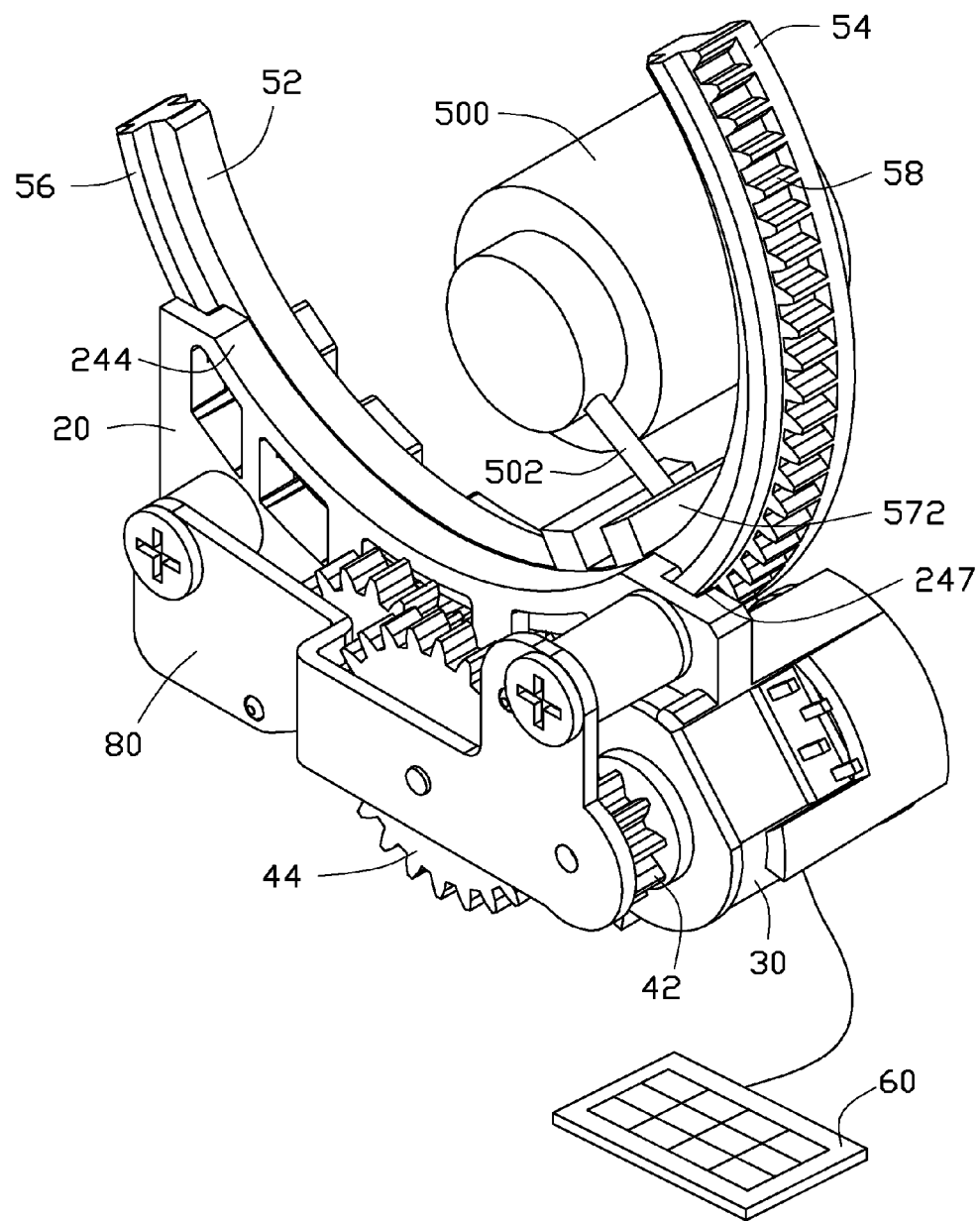

FIGS. 4 and 5 show that in use, the adjustment apparatus 100 is installed in a camera module. The camera module includes a camera lens 500 and an adjustment pin 502 extending from the camera lens 500 and clamped between the clamping poles 572. The controller 60 controls the rotation shaft 32 of the motor 30 to rotate. The shaft 32 drives the drive gear 42 to rotate. The drive gear 42 drives the first gear 442 of the first slave gear 44 to rotate. The second gear 444 drives the third gear 462 of the second slave gear 46 to rotate. The fourth gear 464 meshes with the rack 58, to slide the sliding bar 52, and the first and second guiding bars 54 and 56 along the indent 245, and the first and second guiding slots 246 and 247, respectively. Thereby the adjustment pin 502 can be moved to adjust the camera lens 500, thus, the camera lens 500 can acquire qualified images.

It is to be understood, however, that even though numerous characteristics and advantages of the embodiment have been set forth in the foregoing description, together with details of the structure and function of the embodiment, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. An adjustment apparatus for adjusting a camera lens having an adjustment pin, the adjustment apparatus comprising:
   a supporting bracket;
   a gear assembly installed to the supporting bracket;
   a motor mounted to the supporting bracket;
   a controller electrically connected to the motor; and
   an adjustment member movably installed to the supporting bracket, and comprising two spaced clamping poles for clamping the adjustment pin of the camera lens;
   wherein, when adjusting the camera lens, the controller controls the motor to rotate, the motor drives the gear assembly to rotate, and the gear assembly drives the adjustment member to move, the adjustment pin is moved by the clamping poles to adjust the camera lens.

2. The adjustment apparatus of claim 1, wherein the adjustment member comprises an arc-shaped sliding bar, the sliding bar defines an arc-shaped rack meshing with the gear assembly, the clamping poles extend out from the sliding bar.

3. The adjustment apparatus of claim 2, wherein the supporting bracket comprises a supporting block, the supporting block defines an arc-shaped indent, a first supporting plate extends up from the supporting block at a side of the indent, a second supporting plate extends up from the supporting block at an opposite side of the indent, the sliding bar is received in the indent.

4. The adjustment apparatus of claim 3, wherein the first supporting plate defines an arc-shaped first guiding slot, the second supporting plate defines an arc-shaped second guiding slot, an arc-shaped first guiding bar protrudes out from a first side of the sliding bar, to be slidably received in the first guiding slot of the first supporting plate, an arc-shaped second guiding bar protrudes out from a second side of the sliding bar, to be slidably received in the second guiding slot of the second supporting plate.

5. The adjustment apparatus of claim 3, wherein the gear assembly comprises a drive gear fixed to a rotation shaft of the motor, a first slave gear member meshed with the drive gear, and a second slave gear member meshed with the first slave gear member and the rack of the adjustment member.

6. The adjustment apparatus of claim 5, wherein the second supporting plate defines a receiving space communicating with the indent, the first drive gear member comprises a first gear meshing with the drive gear and a second gear coaxial with the first gear, the second drive gear member comprises a third gear meshing with the second gear and a fourth gear coaxial with the third gear, the fourth gear is received in the receiving space and meshed with the rack of the adjustment member.

7. The adjustment apparatus of claim 6, further comprising a positioning member mounted to the supporting bracket, wherein the gear assembly is sandwiched between the supporting bracket and the positioning member.

8. The adjustment apparatus of claim 7, wherein the first drive gear member further comprises a first shaft, the first and second gears are mounted to the first shaft, the second drive gear member further comprises a second shaft, the third and fourth gears are mounted to the second shaft, the first and second shafts are rotatably connected between the supporting bracket and the positioning member.

9. The adjustment apparatus of claim 7, wherein a plurality of connecting poles is fixed between the supporting bracket and the positioning member.

10. A camera module, comprising:
    a camera lens comprising an adjustment pin;
    a supporting bracket installed in the camera module;
    a gear assembly installed to the supporting bracket;
    a motor mounted to the supporting bracket;
    a controller electrically connected to the motor; and
    an adjustment member movably installed to the supporting bracket, and comprising two spaced clamping poles clamping the adjustment pin of the camera lens;
    wherein the controller controls the motor to rotate, the motor drives the gear assembly to rotate, and the gear assembly drives the adjustment member to move, the adjustment pin is moved by the clamping poles to adjust the camera lens.

11. The camera module of claim 10, wherein the adjustment member comprises an arc-shaped sliding bar, the sliding bar defines an arc-shaped rack meshing with the gear assembly, the clamping poles extend out from the sliding bar.

12. The camera module of claim 11, wherein the supporting bracket comprises a supporting block, the supporting block defines an arc-shaped indent, a first supporting plate extends up from the supporting block at a side of the indent, a second supporting plate extends up from the supporting block at an opposite side of the indent, the sliding bar is received in the indent.

13. The camera module of claim 12, wherein the first supporting plate defines an arc-shaped first guiding slot, the second supporting plate defines an arc-shaped second guiding slot, an arc-shaped first guiding bar protrudes out from a first side of the sliding bar, to be received in the first guiding slot, an arc-shaped second guiding bar protrudes out from a second side of the sliding bar, to be received in the second guiding slot.

14. The camera module of claim 12, wherein the gear assembly comprises a drive gear fixed to a rotation shaft of the motor, a first slave gear member meshed with the drive gear, and a second slave gear member meshed with the first slave gear member and the rack of the adjustment member.

15. The camera module of claim 14, wherein the second supporting plate defines a receiving space communicating with the indent, the first drive gear member comprises a first gear meshing with the drive gear and a second gear coaxial with the first gear, the second drive gear member comprises a third gear meshing with the second gear and a fourth gear coaxial with the third gear, the fourth gear is received in the receiving space and meshed with the rack of the adjustment member.

16. The camera module of claim 15, further comprising a positioning member mounted to the supporting bracket, wherein the gear assembly is sandwiched between the supporting bracket and the positioning member.

17. The camera module of claim 16, wherein the first drive gear member further comprises a first shaft, the first and second gears are mounted to the first shaft, the second drive gear member further comprises a second shaft, the third and fourth gears are mounted to the second shaft, the first and second shafts are rotatably connected between the supporting bracket and the positioning member.

18. The camera module of claim 16, wherein a plurality of connecting poles extends from the supporting bracket, and the positioning member is fixed to the plurality of connecting poles.

* * * * *